Feb. 19, 1952 P. W. SANFORD 2,586,180
ANTISCALD AND PROPORTIONING VALVE
Filed April 22, 1948
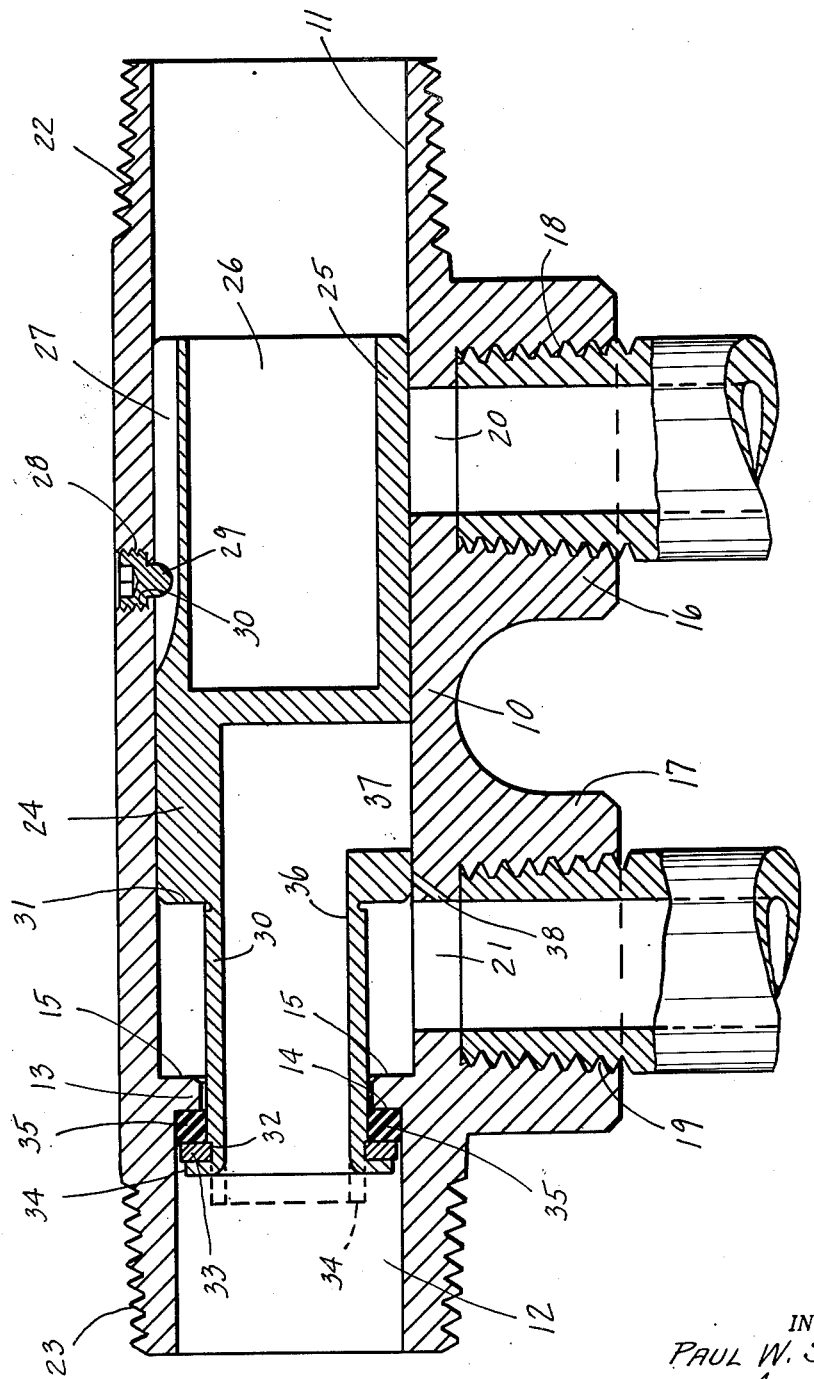
INVENTOR.
PAUL W. SANFORD.
BY
Lockwood Goldsmith Galt
ATTORNEYS.

Patented Feb. 19, 1952

2,586,180

UNITED STATES PATENT OFFICE 2,586,180

ANTISCALD AND PROPORTIONING VALVE

Paul W. Sanford, Indianapolis, Ind., assignor, by direct and mesne assignments, of one-half to Body Guard Valve Co., Inc., a corporation of Indiana, and one-half to Shepherd Machine & Tool Co., Inc.

Application April 22, 1948, Serial No. 22,527

3 Claims. (Cl. 277—20)

This invention relates to valve structure of the anti-scald type.

The chief object of this invention is to provide a valve which simultaneously controls two different supplies and in a proportional manner and which further is of the anti-scald type.

The foregoing in the art refers to a safety valve interposed in or between two supplies such as hot and cold water lines whereby when exceptional cold water draw off occurs resulting in lowering of cold water line pressure, the hot water will be proportionally or completely cut off until standard pressure is reattained in the cold water line.

The chief feature of the present invention resides in the construction of the dual valve member and more particularly its simplicity and compactness.

Other objects and features of the invention will be set forth more fully hereinafter.

The full nature of the invention will be understood from the accompanying drawings and the following description and claims:

In the drawing the figure is a central sectional view of the valve structure embodying the invention, the valve being shown in the closed position, dotted lines indicating the initial formation of the valve member prior to final assembly in the structure.

In the drawing 10 indicates an elongated housing having a bore 11 therein of substantially uniform diameter and of appreciable length. Aligned therewith is a similar bore 12 with a lesser diameter and of lesser length. Therebetween is disposed the annular inwardly directed flange 13 having shoulder 14 defining the inner termination of bore 12 and the shoulder 15 defining the inner termination of bore 11.

Two parallel bosses 16 and 17 are internally threaded as at 18 and 19 respectively and have equal area ports 20 and 21 communicating with the bore 11. These bosses are disposed transversely of the aligned bores aforesaid.

The opposite ends of the body may be externally taper threaded as at 22 and 23 respectively to take couplings elbows or street L's depending upon the type of connection to be made therewith. It is to be observed that the bore 12 is intended to be connected to a hot water supply line with or without a valve control therein. In like manner the bore 11 is intended to be connected to a cold water supply line with or without a valve control in same. Normally the hot and cold water pressures of the supply are equal except when there is a draw off departure therefrom.

As previously indicated herein the threaded portion 18 constitutes the cold water discharge line and this discharge line includes the cold water control valve which is not illustrated herein. In like manner the internally threaded bore 19 is connected to a hot water control line that includes the hot water control valve thereof, not shown.

Reference will now be made to the valve member itself. The piston valve of the present invention is exceedingly simple and compact. It comprises a main body portion 24 from which projects a skirt or sleeve portion 25 providing cavity 26 therein. The skirt exteriorly includes a longitudinal slot 27. The body 10 is tapped at 28 to take a key 29 threaded at 30. It is of the headless type. This key prevents valve rotation upon its longitudinal axis.

Extending oppositely from the valve body portion 24 is the sleeve portion 30 of reduced diameter thus providing shoulder 31. Near the free end there is provided a channel 32 to seat a brass or similar lock ring 33. Initially the free end 34 is disposed in longitudinal alignment with the sleeve portion proper but after assembly it is suitably enlarged outwardly and laterally as shown.

Carried by the sleeve 30 adjacent end 34, and retained by ring 33, is a so-called raw rubber sealing and gripping ring 35. One having a Durometer test of 50–70 has been found satisfactory.

In the cut-off position as shown, the grip ring is compressed to effect sealing and to hold the valve in cut-off position, the ring then bearing on shoulder face 14. Herein the body 24 includes bore 36, an extension of the bore of sleeve 30. A lateral port 37 of the diameter of port 21 is also provided.

When the valve is disposed in wide open position face 31 engages face 15. At this time skirt 25 fully uncovers port 20 and port 37 fully registers with port 21.

Valve assembly may be effected as follows: The valve body or housing has the piston valve applied thereto, the small end entering bore 11. The two are rotatively registered for key and slot association and the key applied. The valve is then mounted on a mandrel applied to chamber 20 and/or the free end of skirt 25 while face 31 contacts face 15. Then the grip and seal ring 35 and washer 33 are applied. When so assembled a flaring tool or similar device turns the free end 34 outwardly as shown. The valve structure is now permanently assembled and properly assembled so that rotative drift cannot occur. This means ports 21—37 will always fully register at wide open valve position.

The position of the ports as shown indicates that there has been a reduction in cold water supply line pressure of from 6 to 8 pounds per square inch. Upon such reduction hot water supply pressure overcomes the then effective cold water supply pressure and the piston valve moves from any position it may have to that shown to wit cutoff position, notwithstanding the hot and cold water discharge line valves being wide open. Thus scalding by accidental cold water pressure reduction cannot occur. The valve is now held in this position by the grip ring and the hot water supply is sealed off by this ring.

Upon reestablishment of cold water supply pressure since the effective area subjected thereto is greater than the hot water pressure subject area, the pressures being assumed to be equal, the valve will be moved to the left to proportionably expose the hot and cold water ports 21 and 20 to their respective supplies. This action is of snap character. At that time valve face 31 engages shoulder face 15. The downstream valves, not shown, determine the hot-cold mixture desired. Obviously the length of skirt 25 and/or length of sleeve 30 determines the proportioning effected by the valve in supplying hot and cold water to the respective discharge lines. Herein the skirt length is such that the proportioning is equal over the entire range.

When it is desired to obtain hot water only it is necessary to first open the downstream cold water discharge line valve to an extent at least sufficient to crack it. Then the hot water valve is opened and the cold water valve is closed.

If the hot water valve is opened or is in an open position and hot water is desired, the cold water valve is cracked and then closed. The grip ring then holds the control valve in hot water valve supplying position. Since the cold water valve is now closed no cold water is discharged.

The present invention accordingly comprises an anti-scald valve that may be used even when only hot water is desired. This valve is exceptionally rugged, simple and compact.

In certain installations the structure described over corrects. To provide proper correction there is provided a compensating arrangement such as a compensating port or passage. It may be disposed immediately to the left of port or passage 37 so that hot water may bleed from fore 12 to port 21 in valve closing.

For purposes of illustration, the alternative equivalent is illustrated as bleed port 38 biased to port 21 and arranged to communicate with valve passage 37 as the valve moves from half open toward closed position. It is so disposed, however, that at closed valve position bleed port 38 will be cut off.

The invention claimed is:

1. In a valve structure for control of fluid flow from two relatively independent pressure fluid supplies and independently subjected to the fluid pressures applicable in opposition and having a cylindrical body having intakes at its opposite ends, one of said intakes being of smaller diameter than the intake at the opposite end thereof, and a pair of transversely disposed aligned independent discharge openings in that portion of the body having the enlarged area, the combination of a tubular valve member reciprocally mounted in said valve body having a medially disposed partition providing a piston and dividing said tubular valve member into oppositely disposed chambers, that chamber communicating with the enlarged area portion of the valve body being of greater area than that chamber communicating with the valve body of reduced area, and said enlarged area chamber having an axial outlet while the reduced area chamber is provided with a transversely disposed outlet, the valve body chamber being divided into two portions by an annular shoulder, and the tubular valve member having an annularly disposed gasket on its reduced end adapted to engage one side of said annular flange under predetermined pressures, and a shoulder on the opposite side of said flange adapted to engage the opposite side of said flange under predetermined pressures.

2. A valve structure as described in claim 1 wherein the gasket is of comparatively soft material and radially expansible to provide a grip ring for engagement with the interior of the reduced diameter valve body chamber.

3. A valve structure as defined by claim 1 wherein means are provided for preventing the axial rotation of the tubular valve member.

PAUL W. SANFORD.

REFERENCES CITED

The following references are of record in the file of this patent:

UNITED STATES PATENTS

| Number | Name | Date |
|---|---|---|
| 611,064 | Demarest | Sept. 20, 1898 |
| 806,271 | Mamsing | Dec. 5, 1905 |
| 1,133,601 | Wood | Mar. 30, 1915 |
| 1,257,070 | Discher | Feb. 19, 1918 |
| 1,359,988 | Hansen | Nov. 23, 1920 |
| 1,842,825 | Cunningham | Jan. 26, 1932 |
| 2,200,578 | Mahon | May 14, 1940 |
| 2,384,227 | Albert | Sept. 4, 1945 |
| 2,414,582 | Crosby | Jan. 21, 1947 |

FOREIGN PATENTS

| Number | Country | Date |
|---|---|---|
| 30,577 | Australia | of 1930 |